US012743361B2

(12) United States Patent
Saini et al.

(10) Patent No.: US 12,743,361 B2
(45) Date of Patent: Sep. 22, 2026

(54) AUTOMATIC GENERATION OF PROCESS INSTRUCTIONS FROM LOG FILES

(71) Applicant: Wells Fargo Bank, N.A., San Francisco, CA (US)

(72) Inventors: Manesh Saini, New York, NY (US); Carleton Jay Lindgren, Jr., Denver, CO (US); James Hubbard, Charlotte, NC (US); Ronald Sobey, Porter, TX (US); Winthrop Treynor Smith, Littleton, CO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/443,069

(22) Filed: Feb. 15, 2024

(65) Prior Publication Data

US 2025/0265169 A1 Aug. 21, 2025

(51) Int. Cl.
*G06F 15/173* (2006.01)
*G06F 11/34* (2006.01)

(52) U.S. Cl.
CPC ................................ *G06F 11/3476* (2013.01)

(58) Field of Classification Search
CPC .................................................. G06F 11/3476
USPC ........................................................ 709/224
See application file for complete search history.

(56) References Cited

U.S. PATENT DOCUMENTS 7,739,286 B2 6/2010 Sethy et al.
10,579,735 B2 3/2020 Kalluri et al.
11,509,540 B2 11/2022 Bernardi et al.
11,595,446 B2 2/2023 Mudgil et al.
2018/0018312 A1 1/2018 Guzman et al.
2023/0034513 A1 2/2023 Cardozo et al.
2023/0132720 A1 5/2023 Khmaissia et al.
2023/0146414 A1* 5/2023 Casati ..................... G06F 18/23 714/26
2023/0153688 A1 5/2023 Vu et al.
2023/0214718 A1 7/2023 Hong et al.
2024/0412720 A1* 12/2024 Vasylyev .......... G06F 16/90332
2024/0420161 A1* 12/2024 Shah .................. G06Q 10/0635
2025/0068398 A1* 2/2025 Zeng ......................... G06F 9/54
2025/0077582 A1* 3/2025 Tca ................... G06F 16/24578
2025/0078648 A1* 3/2025 Ramanasankaran ... G05B 15/02
2025/0110948 A1* 4/2025 Nguyen ................ G06F 16/283

FOREIGN PATENT DOCUMENTS

CN 111414748 A 7/2020
CN 116127046 A 5/2023
CN 116340584 A 6/2023
CN 116432625 A 7/2023
(Continued)

*Primary Examiner* — Alan S Chou
(74) *Attorney, Agent, or Firm* — Shumaker & Sieffert, P.A.

(57) ABSTRACT

A computing system may access log files that log data associated with prior performances of a process by users. Such data may be recorded by one or more computing systems based on tracking user interactions with the one or more computing systems to perform the process. The computing system may generate, using an instructions generation model that is trained using machine learning, the process instructions for performing the process based on the data associated with the prior performances of the process. The process instructions may be human-readable written instructions.

20 Claims, 3 Drawing Sheets

(56) References Cited

FOREIGN PATENT DOCUMENTS

| | | | |
|---|---|---|---|
| CN | 116450827 | A | 7/2023 |
| IN | 202341032898 | | 10/2023 |
| KR | 20230076012 | A | 5/2023 |
| WO | 2021217772 | A1 | 11/2021 |

* cited by examiner

Figure 3:
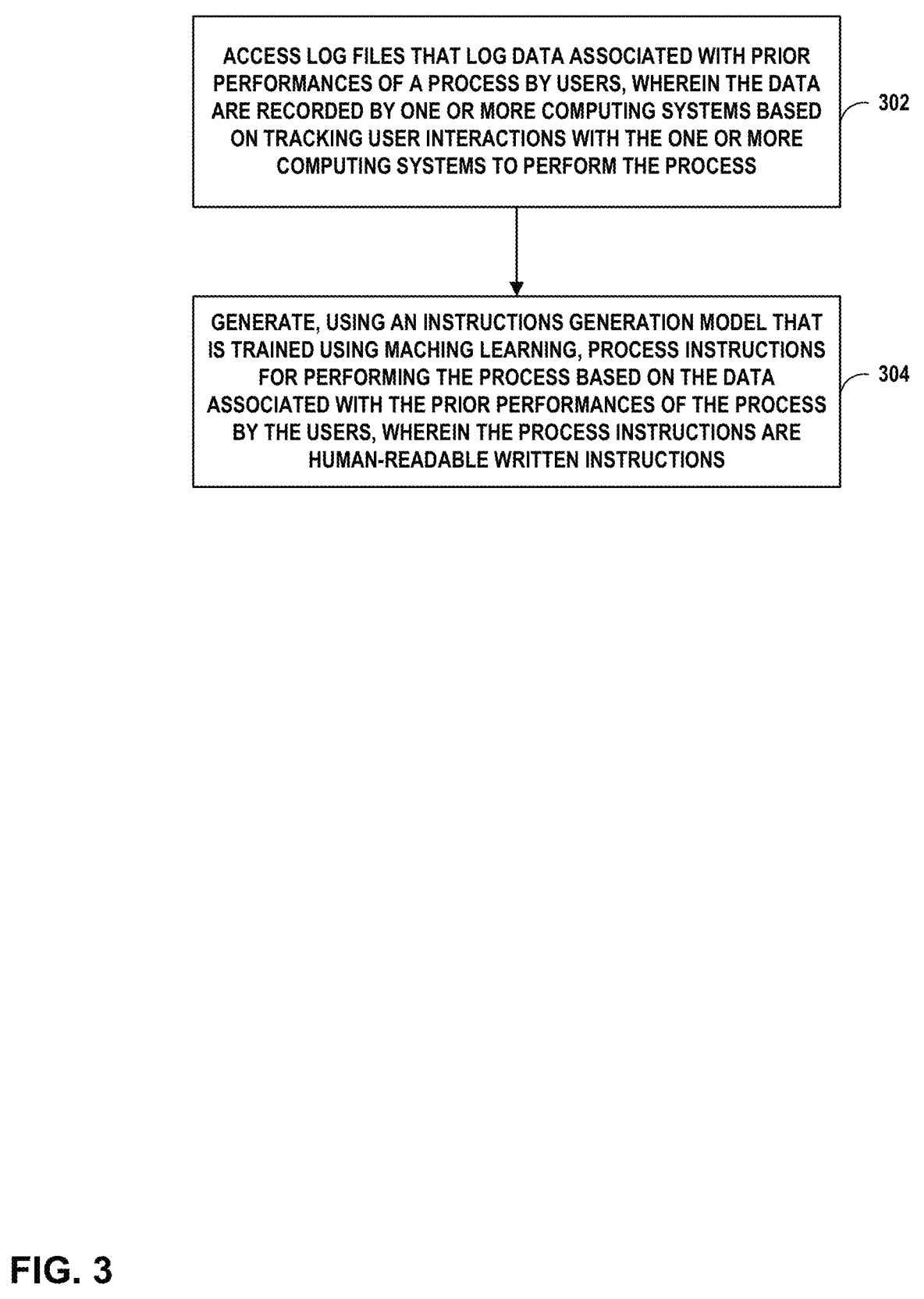

ACCESS LOG FILES THAT LOG DATA ASSOCIATED WITH PRIOR PERFORMANCES OF A PROCESS BY USERS, WHEREIN THE DATA ARE RECORDED BY ONE OR MORE COMPUTING SYSTEMS BASED ON TRACKING USER INTERACTIONS WITH THE ONE OR MORE COMPUTING SYSTEMS TO PERFORM THE PROCESS

302

GENERATE, USING AN INSTRUCTIONS GENERATION MODEL THAT IS TRAINED USING MACHING LEARNING, PROCESS INSTRUCTIONS FOR PERFORMING THE PROCESS BASED ON THE DATA ASSOCIATED WITH THE PRIOR PERFORMANCES OF THE PROCESS BY THE USERS, WHEREIN THE PROCESS INSTRUCTIONS ARE HUMAN-READABLE WRITTEN INSTRUCTIONS

AUTOMATIC GENERATION OF PROCESS INSTRUCTIONS FROM LOG FILES

TECHNICAL FIELD

This disclosure relates to computing systems, and more specifically, to techniques for generating process documents using machine learning.

BACKGROUND

In recent years, organizations have increasingly integrated machine learning into their operations. Organizations have recognized the potential of machine learning to drive innovation, efficiency, and competitiveness, and are using machine learning algorithms to analyze vast datasets, uncovering insights and patterns that inform decision-making for those organizations. Recently, organizations have begun to use large language models for purposes of data analysis to summarize large volumes of text and to extract actionable insights.

SUMMARY

This disclosure describes techniques for using machine learning within an organization to analyze the performance of a process within the organization. A computing system may access log files that log data from prior performances of a process by users within the organization. To perform the process, users may interact with a variety of computing systems, and the log files may log data based on tracking user interactions with the computing systems. The computing system may use data from prior performances of the process into a machine trained model to generate written process instructions, which are instructions for performing the process that a human can read and follow to re-perform the process and/or that can be stored as formal documentation of the process for security and regulatory compliance.

The computing system may train a neural network using machine learning to generate process instructions for a process based on prior performances of the process. For example, the computing system may train and/or fine-tune a foundational large language model (LLM) to generate process instructions in a human-readable format for a process based on prior performances of the process.

Training and/or fine-tuning a foundational LLM to generate process instructions for a process based on prior performances of the process may enable the computing system to train a neural network for the specific task of generating process instructions for a process based on prior performances of the process without having to perform the initial, resource-intensive pre-training of the neural network. Not having to perform pre-training of the neural network may reduce the amount of data that is used and the amount of computational resources that are required to train a neural network to generate process instructions for a process based on prior performances of the process. Furthermore, because a foundational LLM has already been pre-trained and therefore exposed to a wide variety of language use cases and scenarios, a neural network that is based on a foundational LLM may be able to quickly adapt to the specific requirements of generating process instructions with only a small amount of additional training data. As such, the techniques of this disclosure may reduce the use of memory and processing resources that may be required to train a neural network to generate process instructions, thereby providing a technical improvement over prior techniques for training and using a neural network using machine learning to generate process instructions for a process based on prior performances of the process.

In some aspects, the techniques described herein relate to a method including: accessing, by one or more processors, log files that log data associated with prior performances of a process by users, wherein the data are recorded by one or more computing systems based on tracking user interactions with the one or more computing systems to perform the process; and generating, by the one or more processors and using an instructions generation model that is trained using machine learning, process instructions for performing the process based on the data associated with the prior performances of the process, wherein the process instructions are human-readable written instructions.

In some aspects, the techniques described herein relate to a computing system including: memory configured to store log files that log data associated with prior performances of a process by users, wherein the data are recorded by one or more computing systems based on tracking user interactions with the one or more computing systems to perform the process; and one or more processors configured to: access the log files; and generate, using an instructions generation model that is trained using machine learning, process instructions for performing the process based on the data associated with the prior performances of the process, wherein the process instructions are human-readable written instructions.

In some aspects, the techniques described herein relate to a non-transitory computer-readable medium including instructions that, when executed, cause one or more processors of a computing system to: access log files that log data associated with prior performances of a process by users, wherein the data are recorded by one or more computing systems based on tracking user interactions with the one or more computing systems to perform the process; and generate, using an instructions generation model that is trained using machine learning, the process instructions for performing the process based on the data associated with the prior performances of the process, wherein the process instructions are human-readable written instructions.

The details of one or more examples of the disclosure are set forth in the accompanying drawings and the description herein. Other features, objects, and advantages of the disclosure will be apparent from the description and drawings, and from the claims.

BRIEF DESCRIPTION OF THE DRAWINGS

FIG. 3 is a flow diagram illustrating operations performed by an example computing system, in accordance with one or more aspects of the present disclosure.

DETAILED DESCRIPTION

Figure 1:
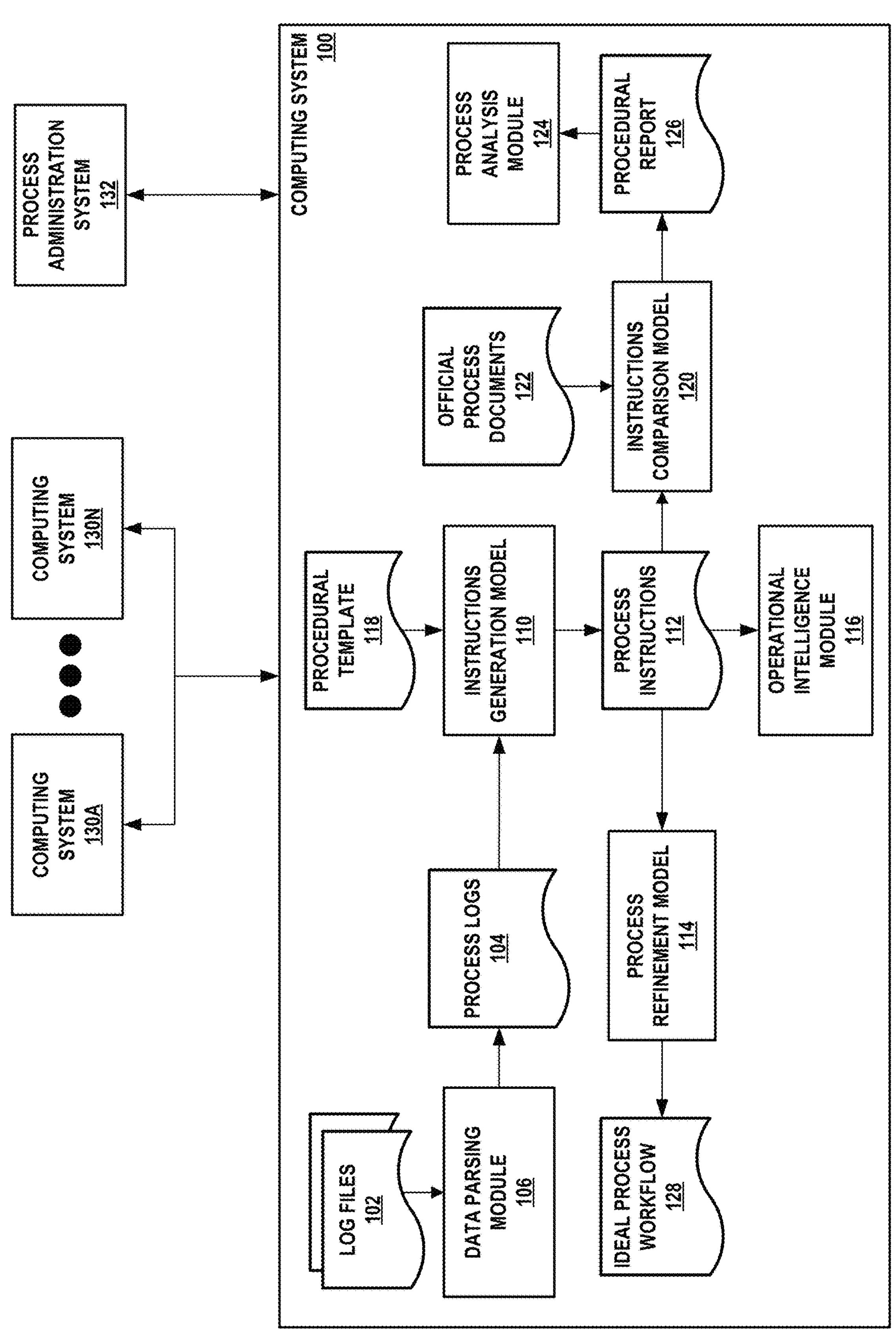
FIG. 1 is a conceptual diagram illustrating an example system for procedure analysis using category-specific models, in accordance with one or more aspects of the present disclosure.

In general, aspects of this disclosure are directed to using machine learning within an organization to analyze the performance of a process within the organization and to generate process instructions for performing the process based on the data from prior performances of the process. In various industries and domains, processes are performed by users to achieve specific tasks or objectives. These processes may involve a series of steps or actions that are performed to achieve the desired outcome.

Different users within an organization may perform the same process in different ways. For example, different users may take different actions in different orders, omit performance of one or more actions, perform one or more extraneous actions, perform the same action in different ways, and the like. While an organization may manually generate a single set of process instructions for performing a process, such manually created process instructions may not fully capture the nuances and variations that can arise during performance of the process by different users within the organization.

In accordance with aspects of this disclosure, a computing system may train a neural network to be an instructions generation model that generates process instructions for performing a given process based on the data from prior performances of the process by users within an organization. The computing system may track actions performed by users during prior performances of the process to log data from prior performances of the process by the users. The logged data may contain valuable information about the steps taken, decisions made, and outcomes achieved during performances of the process.

The instructions generation model may synthesize the different actions and workflows taken by different users to perform the process, as captured in the logged data, to generate a single set of process instructions for performing the process. Using a neural network to generate process instructions for performing a process from data from prior performances of the process by users within an organization may enable the instructions generation model to generate process instructions that capture variations in the prior performances of a process, as indicated by the logged data. That is, if different users perform the same process in different ways (e.g., by performing different numbers of steps, by performing steps of the process in different orders, etc.), the instructions generation model may generate process instructions that captures the different ways the process is performed.

Although manually-created written process instructions may already exist for instructing users to perform a particular process, the sequence of actions indicated in such manually-created written process instructions may deviate significantly from the sequence of actions users are taking to perform the process. For example, laws and regulations may have changed since the manually-created written process instructions were last updated, which may require users to deviate from the manually-created written process instructions. In another example, some users may have found ways to more efficiently perform the process compared to the manually-created written process instructions. By synthesizing the different actions and workflows taken by different users to perform the process to generate a single set of process instructions for performing the process, the techniques of this disclosure may enable the instructions generation model to generate process instructions for performing a process that may be more efficient than manually-created written process instructions while complying with the latest rules and regulations.

The instructions generation model may therefore leverage logged data from prior performances of the process by users to generate process instructions for the process that may provide insights into the patterns, trends, and variations that exist in the process. For example, computing system may be able to derive, from the process instructions, operational intelligence regarding how users within the organization perform the process, and may be able to determine how efficient users are at performing the process, how much do users conform to procedural requirements of the process, and the like.

The computing system may train a neural network using machine learning to generate process instructions for a process based on prior performances of the process. For example, the computing system may train and/or fine-tune a foundational large language model (LLM) to generate process instructions for a process based on prior performances of the process.

Training and/or fine-tuning a foundational LLM to generate process instructions for a process based on prior performances of the process may enable the computing system to train a neural network for the specific task of generating process instructions for a process based on prior performances of the process without having to perform the initial, resource-intensive pre training of the neural network. Not having to perform pre-training of the neural network may reduce the amount of data that is used and the amount of computational resources that is required to train a neural network to generate process instructions for a process based on prior performances of the process. Furthermore, because a foundational LLM has already been pre-trained and therefore exposed to a wide variety of language use cases and scenarios, a neural network that is based on a foundational LLM may be able to more quickly adapt to the specific requirements of generating process instructions with only a small amount of additional training data. As such, the techniques of this disclosure may reduce the use of memory and processing resources, thereby providing a technical improvement over prior techniques for training and using a neural network using machine learning to generate process instructions for a process based on prior performances of the process.

FIG. 1 is a conceptual diagram illustrating an example system for automatic generation of process instructions, in accordance with one or more aspects of the present disclosure. As shown in FIG. 1, computing system 100 represent any suitable computing system, such as one or more desktop computers, laptop computers, mainframes, servers, and the like. In some examples, computing system 100 may represent cloud computing systems that provide access to their respective services via a cloud.

Computing system 100 includes data parsing module 106, process tracking module 108, instructions generation model 110, process refinement model 114, operational intelligence module 116, instructions comparison model 120, and process analysis module 124. Data parsing module 106, process tracking module 108, instructions generation model 110, process refinement model 114, operational intelligence module 116, instructions comparison model 120, and process analysis module 124 may be implemented as software that computing system 100 may execute, or may in some examples include any combination of hardware, firmware, and software.

Computing system 100 may be associated with an organization, such as a company, a school, a charitable organization, and the like. Computing system 100 may be operable to execute data parsing module 106, instructions generation model 110, process refinement model 114, operational intelligence module 116, instructions comparison model 120, and process analysis module 124 to generate process instructions.

A process may be a series of actions that are performed for the purposes of completing a task. In the context of a financial organization (e.g., a bank), examples of processes may include a process for approving a mortgage or other types of loans, a process for opening a bank account, a process for repossessing a vehicle or a home, a process for trading stocks, a process for assessing the value of a home, and the like.

Users within an organization may perform a series of actions to perform a process. For example, to perform a process for approving the mortgage, a computing system in a financial organization may receive the loan application and may assign it to an employee (i.e., a user). The user may perform a series of actions such as conducting a credit check for the applicant, verifying the income of the applicant, perform a debt-to-income ratio calculation, conduct a property appraisal, conduct a title search, conduct underwriting, and/or any other actions in order to approve or deny the loan.

While performing the process for approving the mortgage, the user may perform a series of actions, such as placing and receiving calls to and from other parties (e.g., to and from the appraiser and/or underwriter), sending and receiving e-mails, and the like. The user may perform some of the actions of the process in a particular sequence. For example, the user may perform income verification and a credit check of the applicant before performing other actions of the process. Further, The user may conduct a property appraisal if and only if the applicant passes the debt-to-income ratio calculation.

The users may interact with various computing systems 130A-130N ("computing systems 130") to perform the actions of processes. Each of computing systems 130 may represent any suitable computing system, such as one or more desktop computers, laptop computers, mainframes, servers, and the like. In some examples, each of computing systems 130 may represent cloud computing systems that provide access to their respective services via a cloud. For example, a user may conduct a credit check on a customer by inputting personal information of the customer into a credit check system (e.g., computing system 130A), and the credit check system may, in response, return a credit score for the person. In another example, a user may place and receive calls using a Voice over Internet Protocol (VOIP) system (e.g., computing system 130N).

As users of the organization performs actions of processes by interacting with computing systems 130, computing systems 130 and/or computing system 100 may track and/or log data regarding the actions performed by the users and computing systems 130. For example, computing system 130 and/or computing system 100 (e.g., process tracking module 108 of computing system 100) may track and/or log use of different applications by the users, the computing systems accessed by the users, the interactions of users with computing systems 130 (e.g., keystrokes and/or text entered by the users, cursor movements of the users, options and/or links selected by the users), actions taken by computing systems 130 in response to user interactions, details of messages (e.g., e-mails, text messages, direct messages, instant messages, etc.) sent and received by the users (e.g., the identities of senders and/or recipients of the messages, the contents of the messages, the timestamps of when the messages were sent and received), the details of calls (e.g., video calls, phone calls, teleconference calls, etc.) placed and received by users (e.g., the identities of parties of the call, the contents of the call, text transcriptions of the calls, timestamps of when the calls were placed or received, etc.). Computing systems 130 and/or computing system 100 may also track and log additional data related to the performed actions such as timestamps of each of the actions.

In some examples, computing systems 130 may log data regarding the tracked actions into log files 102 and may send log files 102 to computing system 100. In some examples, computing system 130 may send the data regarding the tracked actions to computing system 100, and computing system 100 may generate log files 102 that includes data regarding the tracked actions. Log files 102 may be stored in a variety of different data stores in computing system 100.

Data parsing module 106 is configured to access and parse log files 102 to extract, from log files 102, data associated with prior performance of a particular process by users within the organization and to store, in process logs 104, data from prior performance of the process by users within the organization. Data parsing module 106 may extract, for each performance of a given process, data such as the user that performed the process, all of the actions taken by the user in performing the process, data regarding each action taken by the user in performing the process (e.g., the action taken, timestamps of the start and end of the action, the contents of messages and/or calls send and/or received to perform the action, etc.), the ordering of the actions taken to perform the process, and the like. Data parsing module 106 may therefore generate process log 104 that contains data regarding each performance of a given process by each user of an organization.

Data parsing module 106 may be able to parse log files 102 to extract all of the logged data regarding a specific performance of a process based on a unique identifier associated with the performance of the process. For example, in the example of a process for processing loan applications, each application may be associated with a unique loan number, which may be an alphanumeric string, such as a string of numbers and/or characters, that is included in all forms of communication regarding the application. Each loan number may also be associated in log files 102 with a particular user that took the actions to process the loan. To extract the actions taken to process the particular application from log files 102, data parsing module 106 may parse log files 102 to search for log entries that contain the loan number associated with the application. Data parsing module 106 may extract all log entries that contain the loan number associated with the application and may include the extracted data associated with the loan number in process logs 104 as the actions taken for a single performance of the loan application process. Process logs 104 may therefore, for a particular loan, include data regarding the user that processed the loan and data regarding all of the actions taken by the user to process the loan.

Process logs 104 may be log files that log, for a given process (e.g., loan approval), data from prior performances of the process by users within the organization. By including log data from prior performance of a process by users within the organization, process logs 104 may capture the general process workflow of the process and all the variances in performing the process, as performed by users within the organization.

Instructions generation model 110 may be configured to receive process log 104 that contains data associated with prior performances of a process, and to generate, based on the data associated with prior performances of a process, process instructions 112 for performing the process. Instructions generation model 110 may synthesize the different actions and workflows taken by different users to perform a given process, as captured in process log 104, to generate a single set of process instructions 112 for performing the process. Process instructions 112 may be human readable process instructions. That is, instructions generation model 110 may generate process instructions 112 that are designed to be read and understood by a human, as opposed to machine-readable instructions, such as computer code, that are designed to be automatically read and processed by a computer.

In some examples, computing system 100 may, in response to instructions generation model 110 generating process instructions 112, send process instructions 112 to process administration system 132. Process administration system 132 may represent any suitable computing system, such as one or more desktop computers, laptop computers, mainframes, servers, and the like. In some examples, process administration system 132 may represent cloud computing systems that provide access to their respective services via a cloud. Process administration system 132 may receive and store process instructions 112 so that other computing systems may be able to retrieve process instructions 112 from process administration system 132. For example, a user that wishes to perform the process may use a computing device to communicate with process administration system 132 in order to access and view process instructions 112 for performing the process.

Instructions generation model 110 may generate process instructions 112 that capture variations in the prior performances of a process, as indicated by the data contained in process log 104. That is, if different users perform the same process in different ways (e.g., by performing different numbers of steps, by performing steps of the process in different orders, etc.), instructions generation model 110 may generate process instructions 112 that captures the different ways the process is performed.

In some examples, instructions generation model 110 may be one or more neural networks trained using machine learning to receive data associated with prior performance of a process and to generate, based on the data, process instructions 112 for performing the process. For example, instructions generation model 110 may be a large language model (LLM). In the example where instructions generation model 110 is a LLM, instructions generation model 110 may be a foundational LLM that is further trained and fine-tuned to generate process instructions for processes within an organization. Examples of foundational models may include Generative Pre-trained Transformer (GPT), Claude, BigScience Large Open-science Open-access Multilingual Language Model (BLOOM), Large Language Model Meta AI (LLaMA), and the like.

In some examples, instructions generation model 110 is configured to generate process instructions 112 in the form of written instructions for performing a process. The written instructions may be verbose textual instructions, such as in the form of a written narrative, that describes how to perform the process, including describing breaks or jumps in the process workflow. In some examples, instructions generation model 110 is trained to generate process instructions 112 that are written instructions formatted for use as training data or for inclusion in a corpus for another machine-trained model configured to operate as a chatbot or a virtual assistant for users of the processes.

In some examples, instructions generation model 110 is configured to generate process instructions 112 in the form of a process map for performing a process. A process map may be a visual representation, such as in the form of a process flowchart, of the steps involved in completing a specific process. A process map may include a series of symbols and arrows that depict a flow of tasks and/or actions from the start of the process to the completion of the process. For example, a process map may include start and end points, that indicate the beginning and the end of the process, steps or tasks that represent the actions that are performed in the process, decision points that indicate decisions that affect the next steps in the process, arrows illustrating the direction of the process flow, inputs and outputs that identify what is needed to perform steps or tasks and what is produced by performing steps or tasks, and/or swim lanes that indicate different roles and/or departments responsible for each step of the process.

In some examples, instructions generation model 110 is configured to map data associated with prior performances of a process given process onto procedural template 118. Procedural template 118 may be a pre-defined framework or structure used to standardize the way processes are captured and presented within an organization, and may be designed to capture the variances in the workflow of a process in in an appropriate format. Procedural template 118 may serve as a guideline for documenting processes to ensure consistency, clarity, and comprehensiveness across process maps. Mapping a process onto a selected procedural template may including mapping process owners and/or people (e.g., human resources), technology (systems, geographic area, applicable regulation), and/or other operational data of the process onto the procedural template.

Instructions generation model 110 may select, based on the process type of the process, procedural template 118 onto which instructions generation model 110 may map data to generate a process map for the process. An organization may have different processing types that correspond to different types of procedural templates. In the example of a financial organization, the types of procedural templates may define a standard format or sequence for certain process types, which may include accounting, financial reporting, regulatory reporting, board report, external audit report, Federal Deposit Insurance Corporation (FDIC) reporting, or the like.

Because instructions generation model 110 may be a neural network that is the result of training a foundational LLM, computing system 100 may prompt instructions generation model 110 to analyze prior performances of the process. For example, computing system 100 may prompt instructions generation model 110 with "given this log file and then the contents of the log file, please develop a process instruction" to cause instructions generation model 110 to generate process instructions 112. In another example, computing system 100 may prompt instructions generation model 110 with "please find the average time it takes to complete a process" to cause instructions generation model 110 to analyze the data regarding prior performance of the process to generate an answer to the average time it takes to complete the process. Such prompts may be automatically generated by computing system 100 and inputted into instructions generation model 110 and/or may be inputted by a user.

Process refinement model 114 may be configured to receive process instructions 112 for performing a process and to generate, based on process instructions 112, an ideal process workflow 128 for the process. Process refinement model 114 may generate such an ideal process workflow 128 through identification of redundant and/or unnecessary steps in the process instructions 112. In some examples, process refinement model 114 may receive feedback from a human reviewer labeling the generated ideal process workflow 128 as appropriate or as needing further review and refinement. Such feedback from a human reviewer may be used to train process refinement model 114 to improve the ideal process workflows generated by process refinement model 114.

In some examples, process refinement model 114 may provide a platform through which a human reviewer is able to review and/or refine the process instructions 112 generated by instructions generation model 110 and to compare the process instructions 112 against a procedure for the process as it should be performed (which may be written down as text, represented as a flowchart, or retained mentally by the human reviewer). Process refinement model 114 may provide a graphical user interface (GUI) for such a platform, and the human reviewer may interact with the platform, such as by providing user input, via the GUI to modify process instructions 112 to represent an ideal workflow for the process and document modifications made to the process instructions. The platform may further enable comparison and verification of the newly drafted, ideal process workflow 128 against existing policies, regulations, and testing requirements.

Operational intelligence module 116 is configured to analyze data regarding prior performances by users of a process and to generate operational intelligence regarding the performance of the process by users. For example, operational intelligence module 116 may be configured to receive process logs 104 and to generate, based on the data in process logs 104, operational intelligence regarding the performance of the process by users.

Operational intelligence module 116 may generate such operational intelligence by using the data regarding prior performances by users of the process to systematically track and document how users perform the process. The operational intelligence may therefore provide insight into how a process is performed by users. In some examples, operational intelligence module 116 may be included in instructions generation model 110 and may operate by prompting instructions generation model 110 to generate such operational intelligence regarding the performance of the process by users.

In some examples, operational intelligence module 116 may generate operational intelligence regarding the performance of a process by users in the form of a singular process flow or process map. Such a process flow or process map may be navigable to provide insights into the performance of the process, such as when the process was started, when the process was completed, the steps of the process that were performed and the sequencing of such steps, when each of the step of the process was performed, the systems used to perform the steps, responsible and/or accountable parties for each step of the process, evidence documenting performance of each of the steps of the process, and the like.

Operational intelligence module 116 may generate operational intelligence that compares the process as performed by users against process instructions 112 and/or ideal process workflow 128. For example, operational intelligence module 116 may generate operational intelligence that includes conformance information, which may indicate how often users conformed to and/or deviated from process instructions 112 and/or ideal process workflow 128. The conformance information may include, for each performance of the process that does not conform to process instructions 112 and/or ideal process workflow 128, detailed information regarding such divergence of the performance from process instructions 112 and/or ideal process workflow 128, such as information regarding specific steps of the process as performed that do not conform to process instructions 112 and/or ideal process workflow 128, information regarding actions taken in those steps, information regarding the person(s) who took those steps, the systems used in taking those steps, and the like. Such detailed information may enable a human review to be able to determine, based on the conformance information, reasons for such deviations, such are whether these deviations are a failure in control or a sign of fraud, whether the process instructions need to be updated, and the like.

In some examples, such conformance information may be in the form of operational control scorecards. The operational control scorecards may rank and/or score users' performances of the process based on how well each user's performance conformed with process instructions 112 and/or ideal process workflow 128. For example, the operational control scorecards may rank each user with a score, such as from one to ten, where a higher score for a user may correspond to a higher level of conformance to process instructions 112 and/or ideal process workflow 128.

Operational intelligence module 116 may also generate operational intelligence that includes efficiency information. Operational efficiency information may include per-user efficiency information that indicates each user's efficiency in performing the process. Such per-user efficiency information may enable the efficiency of different users to be compared, in order to gain insights as to differences in efficiency between users performing the process. For example, operational efficiency information may include, for each user, information such as the total time taken by each user to perform the process, as the number of steps taken by each user to perform the process, the time spent by each user on each of the steps, the actions taken by each to perform each of the steps of the process, and the like, which may enable a human reviewer to determine, based on the efficiency information, answers to questions such as why certain users are taking longer to perform the process than others, why certain users are taking much longer to perform certain steps of the process, and the like.

In some examples, operational intelligence module 116 may perform techniques such as sample-based testing of a process, simulations of the process, and the like to generate operational intelligence regarding the process. For example, operational intelligence module 116 may simulate adding and/or removing steps of a process to generate operational intelligence regarding those simulated processes, such as time saved by removing one or more steps of the process, the money saved by removing one or more steps of the process, and the like.

Operational intelligence module 116 may use data regarding prior performances by users of a process to perform simulations of the process. For example, operational intelligence module 116 may determine how much time a new step would add to the process based on data regarding the average amount of time taken to perform a step of the process, as specified by the data regarding prior performances by users of the process.

Instructions comparison model 120 is configured to identify inconsistencies between official process documents 122 for a process and process instructions 112 for the process that are generated, such as by instructions generation model 110, based on analyzing the performance of the process by users. Such inconsistencies between the official process documents 122 and the process instructions 112 generated by instructions comparison model 120 may be indicative of deviation by users performing a process from the official or ideal written process documents for the process.

Instructions comparison model 120 may be configured to receive, as input, official process documents 122 for a process and process instructions 112 for the process, and to generate a procedural report 126 that indicates inconsistencies between process instructions 112 and official process documents 122 for the process. That is, instructions comparison model 120 may identify differences, also referred to as deltas, between process instructions 112 and official process documents 122 for the process and may generate procedural report 126 that details such differences.

The official process documents 122 for a process may be an official set of instructions for performing the process within an organization. The official process documents 122 may be in any suitable form, such as in the form of written process instructions, process maps, flowcharts, narratives, and the like. The official process documents 122 for performing a process in an organization may be a set of instructions that have been officially approved within the organization as the standardized approach within the organization for performing the process. For example, the official process documents 122 for a process may have been approved by various departments within the organization, such as by the legal department, the finance department, the human resources department, and the like to meet legal, regulatory, financial, and/or compliance needs of the organization.

Instructions comparison model 120 may be configured to categorize the deltas between process instructions 112 and the official process documents 122 to identify where users are deviating from officially prescribed processes indicated in the official process documents 122. For example, instructions comparison model 120 may define or categorize the identified inconsistencies as process step "add," "modify," "counter," or "no change" compared to the official process documents 122, and may tag such inconsistent steps of the process with the appropriate category in procedural report 126.

A process step tagged as "add" may indicate that the particular step has been added to the process indicated in process instructions 112 compared to official process documents 122. A process step tagged as "modify" may indicate that the particular step has been subtracted or modified in process instructions 112 compared to official process documents 122. A process step tagged as "counter" may indicate that the particular step is determined to be more efficient in process instructions 112 compared to official process documents 122. A process step tagged as "no change" may indicate that the particular step in process instructions 112 is consistent with official process documents 122.

In some examples, instructions comparison model 120 is configured to determine whether the actions taken by users to perform a process, as captured in process instructions 112, comply with applicable regulations. Instructions comparison model 120 may receive, as input, process instructions 112, official process documents 122, as well as documents associated with applicable procedures, and may output an analysis of whether actions taken by users to perform a process comply with the applicable regulations. Instructions comparison model 120 may also be able to perform attribution analysis to determine reasons as to why the actions taken by users to perform a process does or does not comply with the applicable regulations.

In some examples, instructions comparison model 120 is configured to determine whether the actions taken by users to perform a process, as captured in process instructions 112, meet efficiency goals for the process. For example, a process may have a goal of being completed in 30 days, and instructions comparison model 120 may be configured to determine whether the actions taken by users to perform a process, as captured in process instructions 112, would meet efficiency goal of completing the process in 30 days.

Instructions comparison model 120 may receive, as input, process instructions 112 and official process documents 122, and may output an analysis of whether actions taken by users to perform a process would meet an efficiency goal. Instructions comparison model 120 may also be able to perform attribution analysis to determine reasons as to why the actions taken by users to perform a process would or would not enable the process to meet the efficiency goal.

In some examples, instructions comparison model 120 is a LLM that is trained using machine learning to receive official process documents 122 and process instructions 112 and to generate, based on the inputs, procedural report 126 that indicates inconsistencies between process instructions 112 and official process documents 122 for the process. Instructions comparison model 120 may be a foundational model that is further trained and fine-tuned to generate process instructions for processes within an organization.

In an example, where computing system 100 is used in an automotive loan division of an organization, instructions generation model 110 may generate process instructions 112 that describe the process, as performed by employees in the automotive loan division, for approving or denying automotive loans. Instructions comparison model 120 may compare the process instructions 112 generated by instructions generation model 110 against official process documents 122 written by the organization that enumerate an approval process for automotive loans. Instructions comparison model 120 may analyze the differences or deltas identified between process instructions 112 and the official process documents 122 to generate procedural report 126 that may indicate how users are deviating from approved processes when approving automotive loans. The organization may use such analysis in procedural report 126 to recommend and/or generate new official process documents 122 to either include the deviation (e.g., if it improves efficiency or compliance) or correct/avoid the deviation (e.g., if it is less efficient, increases errors, violates policies/preferences, etc.).

In some examples, process analysis module 124 is configured to conduct root cause analysis of problems or inconsistencies that emerge in a process workflow based on an identified pattern of deviation from official process documents 122. Process analysis module 124 may be configured to capture unique characteristics associated with the deviation and to determine whether the official process documents 122 of the process may require modification to prevent future inconsistencies. Computing system 100 may communicate with process administration system 132 to send notifications or other indications of the results of the root cause analysis to process administration system 132.

In some scenarios, instructions generation model 110 may be configured to track, in real-time, changes to users' performances of a process and to generate process instructions 112 for the process that are based on tracking the changes to users' performances of the process. For example, as users perform a particular process, computing systems 130 and/or computing system 100 may log the user's actions in real-time into log files 102, and data parsing module 106 may parse log files 102 to update, in real time, process logs 104 to include log entries of actions taken by users to perform the process. Instructions generation model 110 may therefore generate new versions of process instructions 112 for a process that are based on real-time tracking of changes to users' performances of the process, and instructions comparison model 120 may determine, based on the new versions of process instructions 112, patterns of deviations of users' performances of the process from the official process documents 122. Computing system 100 may send the newly generated versions of process instructions 112 and notifications of the patterns of deviations from the official process documents 122 to process administration system 132.

In some examples, changes to users' performance of a process may reflect user adaptions to various circumstances. For example, users may begin deviating from a formal procedure for a given process in order to comply with a recent regulation change that has not been reflected in the formal procedure. Computing system 100 may send indications of the identified patterns of deviations from the official process documents 122 to process administration system 132, which may update official process documents 122 based on the identified patterns of deviations. In. some examples, computing system 100 may also use the identified patterns of deviation to automatically and/or manually update the official process documents 122 to reflect compliance with the recent regulation change. In this way, computing system 100 may enable fast adaptation of written process documentation.

In some examples, changes to users' performance of a process may reflect user error, misunderstanding, or potential fraud or other malicious activity. For example, users may begin deviating from a formal procedure for a given process based on incorrect verbal instructions or a misunderstanding, or based on malicious intent. Computing system 100 may therefore use the identified patterns of deviation to identify training issues with a particular user or across users. Alternatively, computing system 100 may use the identified patterns of deviation to alert management or security personnel to potentially malicious behavior performed by a particular user. In this way, computing system 100 may generate notifications or alerts of anomalies with respect to the formal procedure for further investigation. For example, computing system 100 may send, to process administration system 132, notifications that indicate training issues with a particular user or across users, and/or may send, to process administration system 132, notifications that indicate potentially malicious behavior performed by a particular user.

Figure 2:
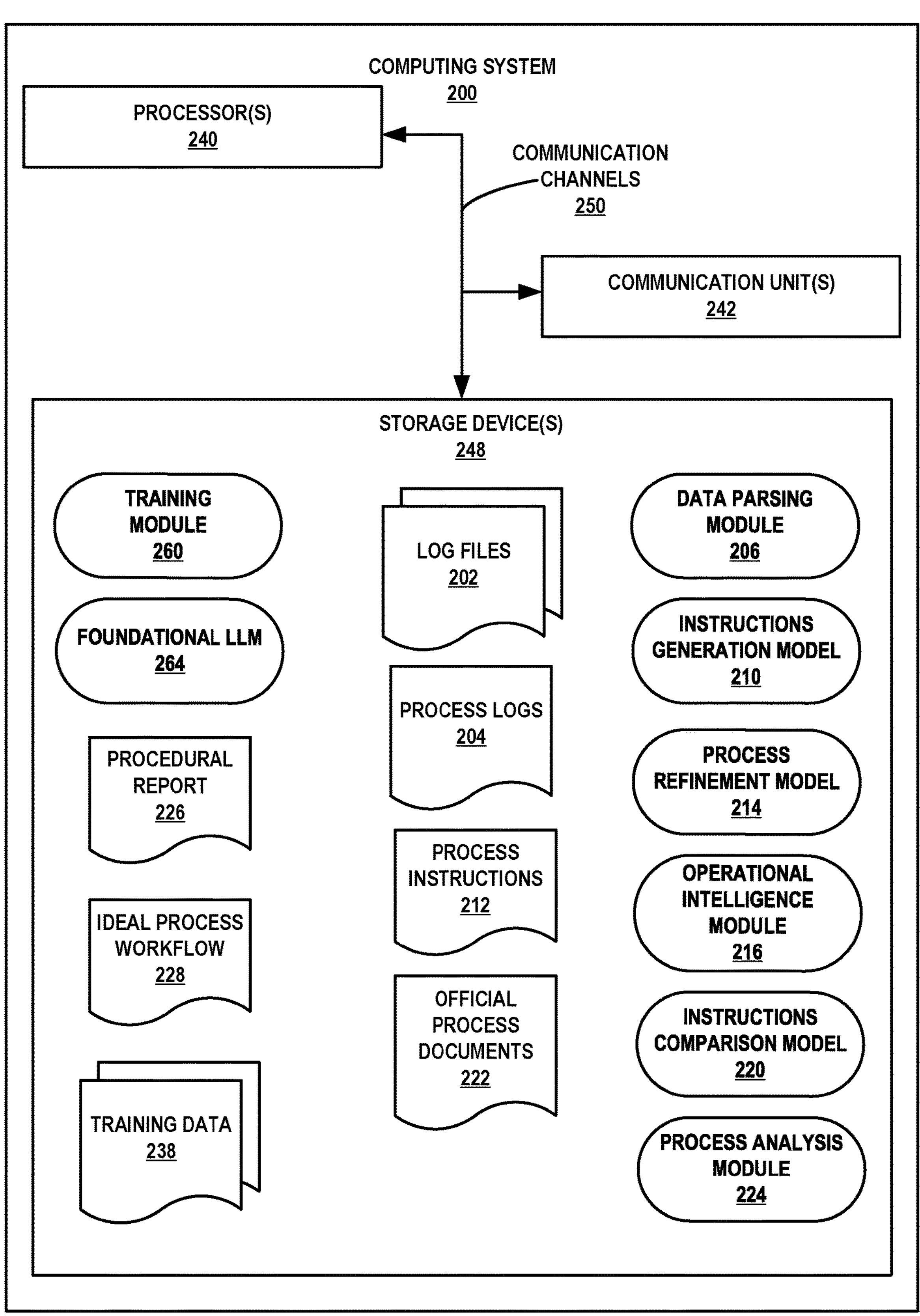
FIG. 2 is a block diagram illustrating an example computing system, in accordance with one or more aspects of the present disclosure.

FIG. 2 is a block diagram illustrating an example computing system, in accordance with one or more aspects of the present disclosure. Computing system 200 of FIG. 2 is described below as an example of computing system 100 of FIG. 1. FIG. 2 illustrates only one particular example of computing system 200, and many other examples of computing system 200 may be used in other instances and may include a subset of the components included in example computing system 200 or may include additional components not shown in FIG. 2. For example, computing system 200 may comprise a cluster of servers, and each of the servers comprising the cluster of servers making up computing system 200 may include all, or some, of the components described herein in FIG. 2, to perform the techniques disclosed herein.

For ease of illustration, computing system 200 is depicted in FIG. 2 as a single computing system. However, in other examples, computing system 200 may be implemented through multiple devices or computing systems distributed across a data center or multiple data centers. For example, computing system 200 (or various modules illustrated in FIG. 2 as included within computing system 200) may be implemented through distributed virtualized compute instances (e.g., virtual machines, containers) of a data center, cloud computing system, server farm, and/or server cluster.

As shown in the example of FIG. 2, computing system 200 includes one or more processors 240, one or more communication units 242, and one or more storage devices 248. One or more storage devices 248 include training module 260, foundational large language model 264, data parsing module 206, instructions generation model 210, process refinement model 214, operational intelligence module 216, instructions comparison model 220, and process analysis module 224. One or more storage devices 248 may also include log files 202, process logs 204, process instructions 212, official process documents 222, procedural report 226, ideal process workflow 228, and training data 238.

Data parsing module 206 is an example of data parsing module of 106 of FIG. 1. Instructions generation model 210 is an example of instructions generation model 210 of FIG. 1. Process refinement model 214 is an example of process refinement model 114 of FIG. 1. Operational intelligence module 216 is an example of operational intelligence module 116 of FIG. 1. Instructions comparison model 220 is an example of instructions comparison model 120 of FIG. 1. Process analysis module 224 is an example of process analysis module 124 of FIG. 1. Log files 202 are an example of log files 102 of FIG. 1. Process logs 204 are examples of process logs 104 of FIG. 1. Process instructions 212 are examples of process instructions 112 of FIG. 1. Official process documents 222 are examples of official process documents 122 of FIG. 1. Procedural reports 226 are examples of procedural reports 126 of FIG. 1. Ideal process workflow 228 is an example of ideal process workflow 128 of FIG. 1.

One or more processors 240 may implement functionality and/or execute instructions associated with computing system 200. Examples of one or more processors 240 include application processors, display controllers, auxiliary processors, one or more sensor hubs, and any other hardware configure to function as a processor, a processing unit, or a processing device. Training module 260, foundational large language model 264, data parsing module 206, instructions generation model 210, process refinement model 214, operational intelligence module 216, instructions comparison model 220, and process analysis module 224 may be operable by one or more processors 240 to perform various actions, operations, or functions of computing system 200. For example, one or more processors 240 of computing system 200 may retrieve and execute instructions stored by one or more storage devices 248 that cause one or more processors 240 to perform the operations of training module 260, foundational large language model 264, data parsing module 206, instructions generation model 210, process refinement model 214, operational intelligence module 216, instructions comparison model 220, and process analysis module 224. The instructions, when executed by one or more processors 240, may cause computing system 200 to store information within one or more storage devices 248.

One or more communication units 242 of computing system 200 may communicate with external devices (e.g., computing systems 130 and process administration system 132) via one or more wired and/or wireless networks by transmitting and/or receiving network signals on the one or more networks. Examples of one or more communication units 242 include a network interface card (e.g., such as an Ethernet card), an optical transceiver, a radio frequency transceiver, a global positioning satellite (GPS) receiver, or any other type of device that can send and/or receive information. Other examples of one or more communication units 242 may include short wave radios, cellular data radios, wireless network radios, as well as universal serial bus (USB) controllers.

Communication channels 250 may interconnect each of the components 240, 242, and 248 for inter-component communications (physically, communicatively, and/or operatively). In some examples, communication channels 250 may include a system bus, a network connection, an inter-process communication data structure, or any other method for communicating data.

One or more storage devices 248 within computing system 200 may store information for processing during operation of computing system 200 (e.g., computing system 200 may store data accessed by training module 260, foundational large language model 264, data parsing module 206, instructions generation model 210, process refinement model 214, operational intelligence module 216, instructions comparison model 220, and process analysis module 224 during execution at computing system 200). In some examples, one or more storage devices 248 is a temporary memory, meaning that a primary purpose of one or more storage devices 248 is not long-term storage. In this example, one or more storage devices 248 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, one or more storage devices 248 may also include one or more computer-readable storage media. One or more storage devices 248, in some examples, include one or more non-transitory computer-readable storage mediums. One or more storage devices 248 may be configured to store larger amounts of information than typically stored by volatile memory. One or more storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. One or more storage devices 248 may store program instructions and/or information (e.g., data) associated with training module 260, foundational large language model 264, data parsing module 206, instructions generation model 210, process refinement model 214, operational intelligence module 216, instructions comparison model 220, and process analysis module 224. One or more storage devices 248 may include a memory configured to store data or other information associated with training module 260, foundational large language model 264, data parsing module 206, instructions generation model 210, process refinement model 214, operational intelligence module 216, instructions comparison model 220, and process analysis module 224.

One or more processors 240 are configured to execute training module 260 to train instructions generation model 210 to generate, based on data associated with prior performances of a process, process instructions 212 for performing the process. Instructions generation model 210 may be one or more neural networks, such as a large language model (LLM), and training module 260 may perform training and/or fine tuning of foundational LLM 264 to generate instructions generation model 210.

In some examples, training module 260 may train instructions generation model 210 to generate process instructions for a process based on prior performances of the process using training data 238 that includes a large number (e.g., tens of thousands) of example process logs detailing prior performances of a process and corresponding process instructions for the process. The example process logs may include process logs having data regarding prior performances of a process that are performed in different ways, and the corresponding process instructions may capture the various ways the process was performed, thereby training instructions generation model 210 to be able to generate process instructions that capture variations in the prior performances of a process. In this way, training module 260 may train instructions generation model 210 to learn how to generate process instructions of a process based on prior performances of the process.

In some examples, training module 260 may train instructions generation model 210 to generate process instructions in the form of human-readable written instructions by using process instructions in the form of human-readable written data to train instructions generation model 210. The written instructions used to train instructions generation model 210 may be verbose textual instructions, such as in the form of a written narrative in natural language, that describes how to perform the process, including describing breaks or jumps in the process workflow. In some examples, to train instructions generation model 210 to generate process instructions that are written instructions formatted for use as training data 238 or for inclusion in a corpus for another machine-trained model configured to operate as a chatbot or a virtual assistant for users of the process, the written instructions used to train instructions generation model 210 may be formatted for use as training data or for inclusion in a corpus for use as training data 238 or for inclusion in a corpus for another machine-trained model configured to operate as a chatbot or a virtual assistant.

In some examples, training module 260 may train instructions generation model 210 to generate process instructions in the form of process maps. For example, training module 260 may train instructions generation model 210 to map data regarding prior performances of a process onto procedural template 218 to generate a process map of the process by training instructions generation model 210 using training data 238 that includes example process logs detailing prior performances of processes, corresponding procedural templates, and corresponding process maps. In this way, training module 260 may train instructions generation model 210 to, for prior performances of a process, select an appropriate procedural template and to map data regarding the prior performances of the process onto the appropriate procedural template to generate a process map of the process.

One or more processors 240 are configured to execute training module 260 to train process refinement model 214 to receive process instructions 212 for performing a process and to identify redundant and/or unnecessary steps in process instructions 212 to generate an ideal process workflow 228 for the process. Process refinement model 214 may be one or more neural networks, such as a large language model (LLM), and training module 260 may perform training and/or fine tuning of foundational LLM 264 to generate process refinement model 214.

In some examples, training module 260 may train process refinement model 214 to generate an ideal workflow for a process and to identify redundant and/or unnecessary steps in the process instructions based on the process instructions. The training data 238 used to train process refinement model 214 includes a large number (e.g., tens of thousands) of example process instructions for processes, corresponding ideal workflows for the process, and corresponding tags for the processes indicating redundant and/or unnecessary steps in the corresponding processes. In this way, training module 260 may train process refinement model 214 to learn how to generate an ideal workflow for a process based on process instructions for the process and to identify redundant and/or unnecessary steps in the process instructions.

One or more processors 240 are configured to execute training module 260 to train instructions comparison model 220 to identify inconsistencies between official process documents 222 for a process and process instructions 212 for the process that are generated, such as by instructions generation model 210. Instructions comparison model 220 may be one or more neural networks, such as a large language model (LLM), and training module 260 may perform training and/or fine tuning of foundational LLM 264 to generate instructions comparison model 220.

In some examples, training module 260 may train instructions comparison model 220 to generate procedural report 226 that indicates inconsistencies between official process documents 222 for a process and process instructions 212 for the process using training data 238 that includes a large number (e.g., tens of thousands) of example process instructions, corresponding official process documents, and corresponding procedural reports that indicate inconsistencies between a corresponding official process documents and a corresponding process instructions. In this way, training module 260 may train instructions comparison model 220 to learn how to generate procedural report 226 that indicates inconsistencies between official process documents 222 for a process and process instructions 212 for the process.

In some examples, training module 260 may train instructions comparison model 220 to generate procedural report 226 that categorizes inconsistencies between official process documents 222 for a process and process instructions 212 for the process. For example, training module 260 may train instructions comparison model 220 using training data 238 that includes a large number (e.g., tens of thousands) of example process instructions, corresponding official process documents, and corresponding procedural reports that indicate and categorize the inconsistencies between a corresponding official process documents and a corresponding process instructions.

In some examples, training module 260 may train instructions comparison model 220 to generate procedural report 226 that indicate whether process instructions 212 for a process comply with applicable regulations. For example, training module 260 may train instructions comparison model 220 using training data 238 that includes a large number (e.g., tens of thousands) of example process instructions, corresponding applicable regulations, and corresponding procedural reports that indicate whether a corresponding process instructions comply with corresponding applicable regulations.

In some examples, training module 260 may train instructions comparison model 220 to generate procedural report 226 that indicate whether process instructions 212 for a process meet efficiency goals. For example, training module 260 may train instructions comparison model 220 using training data 238 that includes a large number (e.g., tens of thousands) of example process instructions and corresponding procedural reports that indicate whether a corresponding process instructions meet efficiency goals.

Training module 260 may train and/or fine-tune instructions comparison model 220 to perform attribution analysis to determine reasons as to why the actions taken by users to perform a process, as indicated in process instructions 212 would or would not enable the process to meet an efficiency goal and/or to comply with applicable regulations. For example, training module 260 may fine-tune instructions comparison model 220 using training data 238 that include a large number (e.g., tens of thousands) of example stimulus and response pairs. Each example stimulus and response pair may include an example process instruction, one or more applicable regulations, one or more efficiency goals, and one or more example questions regarding whether actions indicated in the process instruction would or would not cause the process to meet an efficiency goal and/or to comply with applicable regulations, and a preferred response to the question that is a reasoned answer of whether actions indicated in the process instruction would or would not cause the process to meet an efficiency goal and/or to comply with applicable regulations. In this way, training module 260 may be able to train and fine-tune instructions comparison model 220 to perform attribution analysis to determine reasons as to why the actions taken by users to perform a process, as indicated in process instructions 212 would or would not enable the process to meet an efficiency goal and/or to comply with applicable regulations.

In some examples, instructions comparison model 220 is implemented using the LangChain framework on top of a LLM to create reasoning engines that are able to determine whether process instructions 212 are in compliance with official process documents 222 and/or regulations associated with the process and to determine whether process instructions 212 are able to meet an efficiency goal. Such reasoning engines may be linked together as a chain of thoughts to perform logical reasoning, such as in order to perform attribution analysis to determine reasons as to why a process performed according to process instructions 212 is or is not in compliance with official process documents 222 and/or to determine reasons as to why a process performed according to process instructions 212 is or is not meeting efficiency goals.

For example, the reasoning engines may be able to perform chain of thought prompting of the underlying LLM to instruct the LLM to explicitly reason, step-by-step, the determination made by the LLM of whether process instructions 212 are in compliance with official process documents 222 and/or regulations associated with the process, or the determination made by the LLM of whether process instructions 212 are able to meet an efficiency goal. Instructions comparison model 220 may therefore capture the reasoning outputted by the LLM as reasons as to why the actions taken by users to perform a process, as indicated in process instructions 212 would or would not enable the process to meet an efficiency goal and/or to comply with applicable regulations.

In some examples, instead of training a single instructions comparison model 220 that performs attribution analysis to determine reasons as to why actions taken by users to perform a process, as indicated in process instructions 212 would or would not meet an efficiency goal as well as the reasons as to why the actions would or would not comply with applicable regulations, training module 260 may train and/or fine-tune separate instructions comparison models for performing attribution analysis. Training module 260 may train a first instructions comparison model to performs attribution analysis to determine both the reasons as to why the actions taken by users to perform a process, as indicated in process instructions 212 would or would not enable the process to meet an efficiency goal. Similarly, training module 260 may train a separate, second instructions comparison model to performs attribution analysis to determine both the reasons as to why the actions taken by users to perform a process, as indicated in process instructions 212 would or would not enable the process to comply with applicable regulations.

The two different models may therefore be trained to produce different recommendations based on the attribution analysis. For example, the first instructions comparison model may be able to output, in the procedure report, a recommendation to re-train users that are performing the process within the organization if the first model determines that the actions taken by users to perform a process, as indicated in process instructions 212 would not enable current performance of the process to meet an efficiency goal. Similarly, the second instructions comparison model may be able to output, in the procedure report, a recommendation to shut down performance of the process within the organization if the second model determines that the actions taken by users to perform a process, as indicated in process instructions 212 would not enable current performance the process to comply with applicable regulations.

In some examples, training module 260 may train instructions comparison model 220 to generate procedural report 226 to detect whether patterns of deviations between official process documents 222 for a process and process instructions 212 for the process indicate that the actions taken by users to perform the process, as indicated in process instructions 212, are indicative of user adaptations to comply with a recent regulation change that has not been reflected in official process documents 222. For example, training module 260 may train instructions comparison model 220 using training data 238 that includes a large number (e.g., tens of thousands) of example process instructions, corresponding official process documents, corresponding regulation changes, and corresponding procedural reports that indicate that the inconsistencies between a corresponding official process documents and a corresponding process instructions are the result of user adaptations to comply with a recent regulation change that has not been reflected in the corresponding official process documents.

In some examples, training module 260 may train instructions comparison model 220 to generate procedural report 226 to detect whether patterns of deviations between official process documents 222 for a process and process instructions 212 for the process indicate that the actions taken by users to perform the process, as indicated in process instructions 212, are indicative of user error, misunderstanding, or potential fraud or other malicious activity. For example, training module 260 may train instructions comparison model 220 using training data 238 that includes a large number (e.g., tens of thousands) of example process instructions, corresponding official process documents, and corresponding procedural reports that indicate that the inconsistencies between a corresponding official process documents and a corresponding process instructions are the result of user error, misunderstanding, or potential fraud or other malicious behaviors.

One or more processors 240 are configured to execute process tracking module 208 to track performances of processes by users within an organization and to log data associated with such performances of processes into log files 202. For example, process tracking module 208 may receive, from computing systems 130, data associated with actions performed by users interacting with computing systems 130 to perform actions, and process tracking module 208 may use the data to log actions performed by users to perform the processes into log files 202.

For example, process tracking module 208 may receive, from computing systems 130, data regarding computing systems and websites accessed by users, the interactions of users with the computing systems and websites (e.g., keystrokes and/or text entered by the users, cursor movements of the users, options and/or links selected by the users), details of messages (e.g., e-mails, text messages, direct messages, instant messages, etc.) sent and received by the users (e.g., the identities of senders and/or recipients of the messages, the contents of the messages, the timestamps of when the messages were sent and received), the details of calls (e.g., video calls, phone calls, teleconference calls, etc.) placed and received by users (e.g., ethe identities of parties of the call, the contents of the call, text transcriptions of the calls, timestamps of when the calls were placed or received, etc.). Process tracking module 208 may therefore log such data into log files 202.

One or more processors 240 are configured to execute data parsing module 206 to access and parse log files 202 to extract, from log files 202, data associated with prior performance of a particular process by users within the organization and to store, in process logs 204, data from prior performance of the process by users within the organization. Data parsing module 206 may extract, for each performance of a given process, data such as the user that performed the process, all of the actions taken by the user in performing the process, data regarding each action taken by the user in performing the process (e.g., the action taken, timestamps of the start and end of the action, the contents of messages and/or calls send and/or received to perform the action, etc.), the ordering of the actions taken to perform the process, and the like. Data parsing module 206 may therefore generate process log 204 that contains data regarding each performance of a given process by each user of an organization.

Data parsing module 206 may be able to parse log files 202 to extract all of the logged data regarding a specific performance of a process based on a unique identifier associated with the performance of the process. For example, each entry in log files 202 associated with the performance of a process may include a unique identifier associated with the performance of the process. For example, in the process for approving a loan application, the loan application may be assigned with a unique loan number. While performing actions to approve the loan application, the unique loan number may be used to perform queries in various systems to gather information for approving the loan, be included in messages (e.g., in e-mail messages) about the loan application, be mentioned in phone calls regarding the loan application, and the like.

Data parsing module 206 may therefore be able to extract, from log files 202, log entries for a particular performance of a process by extracting all log entries in log files 202 having a particular unique identifier associated with the particular performance of the process. In this way, data parsing module 206 may generate process logs 204 that include, for each performance of a process, a sequence of timestamped log entries. Process logs 204 may therefore capture the general process workflow of a process and all the variances in performing the process, as performed by users within the organization.

One or more processors 240 are configured to execute instructions generation model 110 to receive, from data parsing module 206, process log 204 that contains data associated with prior performances of a process, and to generate, based on the data associated with prior performances of a process, process instructions 212 for performing the process. Instructions generation model 210 may synthesize the different actions and workflows taken by different users to perform a given process, as captured in process log 204, to generate a single set of process instructions 212 for performing the process.

Instructions generation model 210 may generate process instructions 212 that capture variations in the prior performances of a process, as indicated by the data contained in process log 204. That is, if different users perform the same process in different ways (e.g., by performing different numbers of steps, by performing steps of the process in different orders, etc.), instructions generation model 210 may generate process instructions 212 that captures the different ways the process is performed.

In some examples, instructions generation model 210 is configured to generate process instructions 212 in the form of written instructions for performing a process. The written instructions may be verbose textual instructions, such as in the form of a written narrative, that describes how to perform the process, including describing breaks or jumps in the process workflow. In some examples, instructions generation model 210 is trained to generate process instructions 212 that are written instructions formatted for use as training data 238 or for inclusion in a corpus for another machine-trained model configured to operate as a chatbot or a virtual assistant for users of the processes.

In some examples, instructions generation model 210 is configured to generate process instructions 212 in the form of a process map for performing a process. A process map may be a visual representation, such as in the form of a process flowchart, of the steps involved in completing a specific process. A process map may include a series of symbols and arrows that depict a flow of tasks and/or actions from the start of the process to the completion of the process. For example, a process map may include start and end points, that indicate the beginning and the end of the process, steps or tasks that represent the actions that are performed in the process, decision points that indicate decisions that affect the next steps in the process, arrows illustrating the direction of the process flow, inputs and outputs that identify what is needed to perform steps or tasks and what is produced by performing steps or tasks, and/or swim lanes that indicate different roles and/or departments responsible for each step of the process.

In some examples, instructions generation model 210 is configured to map data associated with prior performances of a process given process onto procedural template 218. Procedural template 218 may be a pre-defined framework or structure used to standardize the way processes are captured and presented within an organization, and may be designed to capture the variances in the workflow of a process in in an appropriate format. Procedural template 218 may serve as a guideline for documenting processes to ensure consistency, clarity, and comprehensiveness across process maps. Mapping a process onto a selected procedural template may including mapping process owners and/or people (e.g., human resources), technology (systems, geographic area, applicable regulation), and/or other operational data of the process onto the procedural template.

Instructions generation model 210 may select, based on the process type of the process, procedural template 218 onto which instructions generation model 210 may map data to generate a process map for the process. An organization may have different processing types that correspond to different types of procedural templates. In the example of a financial organization, the types of procedural templates may define a standard format or sequence for certain process types, which may include accounting, financial reporting, regulatory reporting, board report, external audit report, Federal Deposit Insurance Corporation (FDIC) reporting, or the like.

Computing system 200 may include or otherwise provide a platform through which a human reviewer is able to review and/or refine the process instructions 212 generated by instructions generation model 210 and to compare the process instructions 212 against a procedure for the process as it should be performed (which may be written down as text, represented as a flowchart, or retained mentally by the human reviewer). The human reviewer may interact with the platform, such as by providing user input, to modify process instructions 212 to represent an ideal workflow for the process and document modifications made to the process instructions. The platform may further enable comparison and verification of the newly drafted, ideal process workflow 228 against existing policies, regulations, and testing requirements.

One or more processors 240 are configured to execute process refinement model 214 may to receive process instructions 212 for performing a process and to generate, based on process instructions 212, an ideal process workflow 228 for the process. Process refinement model 214 may generate such an ideal process workflow 228 through identification of redundant and/or unnecessary steps in the process instructions 212. In some examples, process refinement model 214 may receive feedback from a human reviewer labeling the generated ideal process workflow 228 as appropriate or as needing further review and refinement. Such feedback from a human reviewer may be used to train process refinement model 214 to improve the ideal process workflows generated by process refinement model 214.

One or more processors 240 are configured to execute operational intelligence module 216 to analyze data regarding prior performances by users of a process and to generate operational intelligence regarding the performance of the process by users. For example, operational intelligence module 216 may be configured to receive process logs 204 and to generate, based on the data in process logs 204, operational intelligence regarding the performance of the process by users.

Operational intelligence module 216 may generate such operational intelligence by using the data regarding prior performances by users of the process to systematically track and document how users perform the process. The operational intelligence may therefore provide insight into how a process is performed by users. In some examples, operational intelligence module 216 may be included in instructions generation model 210 and may operate by prompting instructions generation model 210 to generate such operational intelligence regarding the performance of the process by users.

In some examples, operational intelligence module 216 may generate operational intelligence regarding the performance of a process by users in the form of a singular process flow or process map. Such a process flow or process map may be navigable to provide insights into the performance of the process, such as when the process was started, when the process was completed, the steps of the process that were performed and the sequencing of such steps, when each of the step of the process was performed, the systems used to perform the steps, responsible and/or accountable parties for each step of the process, evidence documenting performance of each of the steps of the process, and the like.

Operational intelligence module 216 may generate operational intelligence that compares the process as performed by users against process instructions 212. For example, operational intelligence module 216 may generate operational intelligence that includes conformance information, which may indicate how often users conformed to and/or deviated from process instructions 212. The conformance information may include, for each performance of the process that does not conform to process instructions 212, detailed information regarding such divergence of the performance from process instructions 212, such as information regarding specific steps of the process as performed that do not conform to process instructions 212, information regarding actions taken in those steps, information regarding the person(s) who took those steps, the systems used in taking those steps, and the like. Such detailed information may enable a human review to be able to determine, based on the conformance information, reasons for such deviations, such are whether these deviations are a failure in control or a sign of fraud, whether the process instructions need to be updated, and the like.

In some examples, such conformance information may be in the form of operational control scorecards. The operational control scorecards may rank and/or score users' performances of the process based on how well each user's performance conformed with process instructions 212. For example, the operational control scorecards may rank each user with a score, such as from one to ten, where a higher score for a user may correspond to a higher level of conformance to process instructions 212.

Operational intelligence module 216 may also generate operational intelligence that includes efficiency information. Operational efficiency information may include per-user efficiency information that indicates each user's efficiency in performing the process. Such per-user efficiency information may enable the efficiency of different users to be compared, in order to gain insights as to differences in efficiency between users performing the process. For example, operational efficiency information may include, for each user, information such as the total time taken by each user to perform the process, as the number of steps taken by each user to perform the process, the time spent by each user on each of the steps, the actions taken by each to perform each of the steps of the process, and the like, which may enable a human reviewer to determine, based on the efficiency information, answers to questions such as why certain users are taking longer to perform the process than others, why certain users are taking much longer to perform certain steps of the process, and the like.

In some examples, operational intelligence module 216 may perform techniques such as sample-based testing of a process, simulations of the process, and the like to generate operational intelligence regarding the process. For example, operational intelligence module 216 may simulate adding and/or removing steps of a process to generate operational intelligence regarding those simulated processes, such as time saved by removing one or more steps of the process, the money saved by removing one or more steps of the process, and the like.

Operational intelligence module 216 may use data regarding prior performances by users of a process to perform simulations of the process. For example, operational intelligence module 216 may determine how much time a new step would add to the process based on data regarding the average amount of time taken to perform a step of the process, as specified by the data regarding prior performances by users of the process.

One or more processors are configured to execute instructions comparison model 220 to identify inconsistencies between official process documents 222 for a process and process instructions 212 for the process that are generated, such as by instructions generation model 210, based on analyzing the performance of the process by users. Such inconsistencies between the official process documents 222 and the process instructions 212 generated by instructions comparison model 220 may be indicative of deviation by users performing a process from the official or ideal written process documents for the process.

Instructions comparison model 220 may receive, as input, official process documents 222 for a process and process instructions 212 for the process, and to generate a procedural report 226 that indicates inconsistencies between process instructions 212 and official process documents 222 for the process. That is, instructions comparison model 220 may identify differences, also referred to as deltas, between process instructions 212 and official process documents 222 for the process and may generate procedural report 226 that details such differences.

The official process documents 222 for a process may be an official set of instructions for performing the process within an organization. The official process documents 222 may be in any suitable form, such as in the form of written process instructions, process maps, flowcharts, narratives, and the like. The official process documents 222 for performing a process in an organization may be a set of instructions that have been officially approved within the organization as the standardized approach within the organization for performing the process. For example, the official process documents 222 for a process may have been approved by various departments within the organization, such as by the legal department, the finance department, the human resources department, and the like to meet legal, regulatory, financial, and/or compliance needs of the organization.

Instructions comparison model 220 may be configured to categorize the deltas between process instructions 212 and the official process documents 222 to identify where users are deviating from officially prescribed processes indicated in the official process documents 222. For example, instructions comparison model 220 may define or categorize the identified inconsistencies as process step "add," "modify," "counter," or "no change" compared to the official process documents 222, and may tag such inconsistent steps of the process with the appropriate category in procedural report 226.

A process step tagged as "add" may indicate that the particular step has been added to the process indicated in process instructions 212 compared to official process documents 222. A process step tagged as "modify" may indicate that the particular step has been subtracted or modified in process instructions 212 compared to official process documents 222. A process step tagged as "counter" may indicate that the particular step is determined to be more efficient in process instructions 212 compared to official process documents 222. A process step tagged as "no change" may indicate that the particular step in process instructions 212 is consistent with official process documents 222.

In some examples, instructions comparison model 220 is configured to determine whether the actions taken by users to perform a process, as captured in process instructions 212, comply with applicable regulations. Instructions comparison model 220 may receive, as input, process instructions 212, official process documents 222, as well as documents associated with applicable procedures, and may output an analysis of whether actions taken by users to perform a process comply with the applicable regulations. Instructions comparison model 220 may also be able to perform attribution analysis to determine reasons as to why the actions taken by users to perform a process does or does not comply with the applicable regulations.

In some examples, one or more processors are configured to execute instructions comparison model 220 to determine whether the actions taken by users to perform a process, as captured in process instructions 212, meet efficiency goals for the process. For example, a process may have a goal of being completed in 30 days, and instructions comparison model 220 may be configured to determine whether the actions taken by users to perform a process, as captured in process instructions 212, would meet efficiency goal of completing the process in 30 days.

Instructions comparison model 220 may receive, as input, process instructions 212 and official process documents 222, and may output an analysis of whether actions taken by users to perform a process would meet an efficiency goal. Instructions comparison model 220 may also be able to perform attribution analysis to determine reasons as to why the actions taken by users to perform a process would or would not enable the process to meet the efficiency goal.

In some examples, process analysis module 224 is configured to conduct root cause analysis of problems or inconsistencies that emerge in a process workflow based on an identified pattern of deviation from official process documents 222. Process analysis module 224 may be configured to capture unique characteristics associated with the deviation and to determine whether the official process documents 222 of the process may require modification to prevent future inconsistencies.

In some scenarios, instructions generation model 210 may be configured to track, in real-time, changes to users' performances of a process and to generate process instructions 212 for the process that are based on tracking the changes to users' performances of the process. For example, as users perform a particular process, computing system 200 may log the user's actions in real-time into log files 202, and data parsing module 206 may parse log files 202 in real time to update process logs 204, in real-time, to include log entries of actions taken by users to perform the process. Instructions generation model 210 may therefore generate process instructions 212 for a process that are based on real-time tracking of changes to users' performances of the process, and instructions comparison model 220 may determine, based on process instructions 212, patterns of deviations of users' performances of the process from the official process documents 222.

In some examples, changes to users' performance of a process may reflect user adaptions to various circumstances. For example, users may begin deviating from a formal procedure for a given process in order to comply with a recent regulation change that has not been reflected in the formal procedure. Computing system 200 may therefore use the identified patterns of deviation to automatically and/or manually update the official process documents 222 to reflect compliance with the recent regulation change. In this way, computing system 200 may enable fast adaptation of written process documentation.

In some examples, changes to users' performance of a process may reflect user error, misunderstanding, or potential fraud or other malicious activity. For example, users may begin deviating from a formal procedure for a given process based on incorrect verbal instructions or a misunderstanding, or based on malicious intent. Computing system 200 may therefore use the identified patterns of deviation to identify training issues with a particular user or across users. Alternatively, computing system 200 may use the identified patterns of deviation to alert management or security personnel to potentially malicious behavior performed by a particular user. In this way, computing system 200 may generate notifications or alerts of anomalies with respect to the formal procedure for further investigation.

FIG. 3 is a flow diagram illustrating operations performed by an example computing system, in accordance with one or more aspects of the present disclosure. FIG. 3 is described below within the context of computing system 200 of FIG. 1. In other examples, operations described in FIG. 2 may be performed by one or more other components, modules, systems, or devices. Further, in other examples, operations described in connection with FIG. 2 may be merged, performed in a difference sequence, omitted, or may encompass additional operations not specifically illustrated or described.

In the process illustrated in FIG. 3, and in accordance with one or more aspects of the present disclosure, one or more processors 240 may access log files 202 that log data associated with prior performances of a process by users, wherein the data are recorded by one or more computing systems based on tracking user interactions with the one or more computing systems to perform the process (302). One or more processors 240 may generate, using an instructions generation model 210 that is trained using machine learning to generate process instructions 212, the process instructions 212 for performing the process based on the data associated with the prior performances of the process, wherein the process instructions 212 are human-readable written instructions (304).

In some examples, to generate the process instructions 212, the one or more processors 240 may select a procedural template 218 for the process. One or more processors 240 may map, using the instructions generation model 210, the data associated with the prior performances of the process by the users onto the procedural template 218 to generate a process map for performing the process.

In some examples, the one or more processors 240 may train a foundational large language model 264 to be the instructions generation model 210 that generates, from the data associated with the prior performances of the process by the users, the process instructions 212 for performing the process.

In some examples, to access the log files 202 that log the data associated with the prior performances of the process by the users, one or more processors 240 may parse the log files 202 to determine log entries associated with the same unique identifier as data associated with an instance of a prior performance of the process by a user and may include the data associated with the instance of the prior performance of the process by the user in the data associated with the prior performances of the process by the users.

In some examples, one or more processors 240 may generate, using a process refinement model 214 trained using machine learning to refine the process instructions 212, an ideal process workflow 228 for the process. In some examples, one or more processors 240 may generate operational intelligence associated with the prior performances of the process that includes at least one of conformance information associated with the prior performances of the process or efficiency information associated with the prior performance of the process.

In some examples, one or more processors 240 may train a foundational large language model 264 to be the instructions comparison model 220 that compares the process instructions 212 and official process documents 222 for the process to generate a procedural report 226 that indicates inconsistencies between the process instructions 212 and the official process documents 222 for the process.

In some examples, the instructions comparison model 220 includes one or more reasoning engines implemented using a LangChain framework to perform attribution analysis of why the actions taken by the users to perform the process would enable the process to meet an efficiency goal, and wherein the procedural report 226 includes the attribution analysis.

In some examples, the procedural report 226 may categorize differences between the process instructions 212 and the official process documents 222 as add, modify, counter, or no change. In some examples, the procedural report 226 may indicate that the inconsistencies between the process instructions 212 and the official process documents 222 for the process are due to malicious behavior by one or more of the users. In some examples, the procedural report 226 may indicate that the inconsistencies between the process instructions and the official process documents 222 for the process are due to compliance with recent regulation changes.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, only a limited number of devices (e.g., computing system 100, computing system 200, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

accessing, by one or more processors, log files that log data associated with a plurality of prior performances of a process by users, wherein the data are recorded by one or more computing systems based on tracking user interactions with the one or more computing systems to perform the process during each performance of the plurality of prior performances of the process; and generating, by the one or more processors and using an instructions generation model that is trained using machine learning, process instructions for performing the process based on inputting the data associated with each of the plurality of prior performances of the process into the instructions generation model at inference time and synthesizing, by the instructions generation model, the data associated with each of the plurality of prior performances of the process, including different actions taken by different users across the plurality of prior performances of the process, to generate the process instructions, wherein the process instructions specify a sequence of actions to perform the process based on an ordering of two or more of the different actions taken to perform the process during the plurality of prior performances, and wherein the process instructions are human-readable written instructions.

2. The method of claim 1, wherein generating the process instructions further comprises:

selecting, by the one or more processors, a procedural template for the process; and mapping, by the one or more processors and using the instructions generation model, the data associated with the plurality of prior performances of the process by the users onto the procedural template to generate a process map for performing the process.

3. The method of claim 1, further comprising:

training, by the one or more processors, a foundational large language model to be the instructions generation model that generates, from the data associated with the plurality of prior performances of the process by the users, the process instructions for performing the process.

4. The method of claim 1, wherein accessing the log files that log the data associated with the plurality of prior performances of the process by the users further comprises:

parsing, by the one or more processors, the log files to determine log entries associated with the same unique identifier as data associated with an instance of a prior performance of the process by a user; and including, by the one or more processors, the data associated with the instance of the prior performance of the process by the user in the data associated with the plurality of prior performances of the process by the users.

5. The method of claim 1, further comprising:

generating, by the one or more processors and using a process refinement model trained using machine learning to refine the process instructions, an ideal process workflow for the process.

6. The method of claim 1, further comprising:

generating, by the one or more processors, operational intelligence associated with the plurality of prior performances of the process that includes at least one of conformance information associated with the plurality of prior performances of the process or efficiency information associated with the plurality of prior performances of the process.

7. The method of claim 1, further comprising:

generating, by the one or more processors and using an instructions comparison model that is trained using machine learning to compare the process instructions and official process documents for the process, a procedural report that indicates inconsistencies between the process instructions and the official process documents for the process.

8. The method of claim 7, further comprising:

training, by the one or more processors, a foundational large language model to be the instructions comparison model that compares the process instructions and official process documents for the process to generate a procedural report that indicates inconsistencies between the process instructions and the official process documents for the process.

9. The method of claim 8, wherein the instructions comparison model includes one or more reasoning engines implemented using a LangChain framework to perform attribution analysis of why actions taken by the users to perform the process would enable the process to meet an efficiency goal, and wherein the procedural report includes the attribution analysis.

10. The method of claim 7, wherein the procedural report categorizes differences between the process instructions and the official process documents as add, modify, counter, or no change.

11. The method of claim 7, wherein the procedural report indicates that the inconsistencies between the process instructions and the official process documents for the process are due to malicious behavior by at least one of the users.

12. The method of claim 7, wherein the procedural report indicates that the inconsistencies between the process instructions and the official process documents for the process are due to compliance with recent regulation changes.

13. A computing system comprising:

memory configured to store log files that log data associated with a plurality of prior performances of a process by users, wherein the data are recorded by one or more computing systems based on tracking user interactions with the one or more computing systems to perform the process during each performance of the plurality of prior performances of the process; and one or more processors configured to:

access the log files; and generate, using an instructions generation model that is trained using machine learning, process instructions for performing the process based on inputting the data associated with each of the plurality of prior performances of the process into the instructions generation model at inference time and synthesizing, by the instructions generation model, the data associated with each of the plurality of prior performances of the process, including different actions taken by different users across the plurality of prior performances of the process, to generate the process instructions, wherein the process instructions specify a sequence of actions to perform the process based on an ordering of two or more of the different actions taken to perform the process during the plurality of prior performances, and wherein the process instructions are human-readable written instructions.

14. The computing system of claim 13, wherein to generate the process instructions, the one or more processors are further configured to:

select a procedural template for the process; and map, using the instructions generation model, the data associated with the plurality of prior performances of the process by the users onto the procedural template to generate a process map for performing the process.

15. The computing system of claim 13, the one or more processors are further configured to:

train a foundational large language model to be the instructions generation model that generates, from the data associated with the plurality of prior performances of the process by the users, the process instructions for performing the process.

16. The computing system of claim 13, wherein to access the log files that log the data associated with the plurality of prior performances of the process by the users, the one or more processors are further configured to:

parse the log files to determine log entries associated with the same unique identifier as data associated with an instance of a prior performance of the process by a user; and include the data associated with the instance of the prior performance of the process by the user in the data associated with the plurality of prior performances of the process by the users.

17. The computing system of claim 13, wherein the one or more processors are further configured to:

generate, using a process refinement model trained using machine learning to refine the process instructions, an ideal process workflow for the process.

18. The computing system of claim 13, wherein the one or more processors are further configured to:

generate operational intelligence associated with the plurality of prior performances of the process that includes at least one of conformance information associated with the plurality of prior performances of the process or efficiency information associated with the plurality of prior performances of the process.

19. The computing system of claim 13, wherein the one or more processors are further configured to:

generate, using an instructions comparison model that is trained using machine learning to compare the process instructions and official process documents for the process, a procedural report that indicates inconsistencies between the process instructions and the official process documents for the process.

20. A non-transitory computer-readable medium comprising instructions that, when executed, cause one or more processors of a computing system to:

access log files that log data associated with a plurality of prior performances of a process by users, wherein the data are recorded by one or more computing systems based on tracking user interactions with the one or more computing systems to perform the process during each performance of the plurality of prior performances of the process; and generate, using an instructions generation model that is trained using machine learning, the process instructions for performing the process based on inputting the data associated with each of the plurality of prior performances of the process into the instructions generation model at inference time and synthesizing, by the instructions generation model, the data associated with each of the plurality of prior performances of the process, including different actions taken by different users across the plurality of prior performances of the process, to generate the process instructions, wherein the process instructions specify a sequence of actions to perform the process based on an ordering of two or more of the different actions taken to perform the process during the plurality of prior performances, and wherein the process instructions are human-readable written instructions.

* * * * *